US008731330B2

(12) United States Patent
Sudheendra et al.

(10) Patent No.: US 8,731,330 B2
(45) Date of Patent: May 20, 2014

(54) APPARATUS AND METHOD FOR COMPOSING IMAGES IN AN IMAGE PROCESSING DEVICE

(75) Inventors: Pavan Sudheendra, Bangalore (IN); Rajagopalan Venkata Raghavan, Bangalore (IN); Yogesh Manav, Bangalore (IN); Rajaram Hanumantacharya Naganur, Bangalore (IN); Shubham Baidvanath Bhattacharya, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 80 days.

(21) Appl. No.: 13/567,475

(22) Filed: Aug. 6, 2012

(65) Prior Publication Data

US 2013/0034312 A1 Feb. 7, 2013

(30) Foreign Application Priority Data

Aug. 4, 2011 (IN) .......................... 2683/CHE/2011
Jul. 30, 2012 (KR) ........................ 10-2012-0083081

(51) Int. Cl.
*G06K 9/36* (2006.01)
*G06K 9/00* (2006.01)

(52) U.S. Cl.
USPC .......................................................... 382/284

(58) Field of Classification Search
USPC .......... 382/253, 276, 284, 294; 345/427, 433, 345/629
See application file for complete search history.

(56) References Cited

U.S. PATENT DOCUMENTS 6,359,617 B1 * 3/2002 Xiong .......................... 715/848
6,434,265 B1 * 8/2002 Xiong et al. .................. 382/154
8,509,565 B2 * 8/2013 Chen ............................ 382/284
2013/0034312 A1 * 2/2013 Sudheendra et al. ......... 382/284

* cited by examiner

*Primary Examiner* — Amir Alavi
(74) *Attorney, Agent, or Firm* — The Farrell Law Firm, P.C.

(57) ABSTRACT

An apparatus and method for composing images in an image processing device are provided. The method includes identifying an object in an overlap region of a plurality of images; generating a Gaussian curve for the object; determining an alpha mask for the overlap region using the Gaussian curve; and blending the plurality of images based on the alpha mask.

12 Claims, 7 Drawing Sheets

Image 1
201
$W_{offset}$
301 Region 1
$h_{offset}$
302 Region 2
203
Object 1
Image 2
202

APPARATUS AND METHOD FOR COMPOSING IMAGES IN AN IMAGE PROCESSING DEVICE

PRIORITY

This application claims priority under 35 U.S.C. §119(a) to Indian Patent Application Serial No. 2683/CHE/2011, which was filed in the Indian Patent Office on Aug. 4, 2011, and Korean Patent Application Serial No. 10-2012-0083081, which was filed in the Korean Intellectual Office on Jul. 30, 2012, the content of each of which is incorporated herein by reference.

BACKGROUND OF THE INVENTION

1. Field of the Invention

The present invention relates generally to an image processing device, and more particularly, to an apparatus and method for composing images in the image processing device.

2. Description of the Related Art

Alpha blending is a technique of combining multiple source images by using weighted values of corresponding pixels in the source images to generate a composite blended image, wherein a foreground image has a translucency graphical effect. An alpha/transparency value for an alpha mask ranges from zero '0' to one '1', where 0 is a transparent pixel and 1 is an opaque pixel. The alpha value helps in blending foreground and background pixels, and the degree of contribution by the foreground and background pixels is determined from the alpha value.

However, the alpha blending does not use a correlation between the content information of images being blended, which often reduces visual appeal of the composite image by blending objects with the background/other images. The blending of the objects with the background/other images may partially or completely fade the objects, thereby compromising the visibility of the content of the object.

Image frequencies are subjected to interference effects in Alpha blending. Further, alpha blending introduces visual ambiguity by introducing fading in the composite blended image. Accordingly, it is often difficult to identify which feature belongs to which layer in an alpha blended image.

Further, in the alpha blending, alpha mask generation causes a visible seam and a ghosting effect. Specifically, visible seams appear when an overlap widow is too small or if the considered two images are very distinct. A ghosting effect occurs when a size of the overlap window is too large.

Present blending technologies depend on optimum window size to avoid a seam and/or a ghosting effect. Further, the present technologies do not address the problem of ghosting, when an overlap window size is fixed and cannot be changed during blending.

SUMMARY OF THE INVENTION

The present invention is designed to address the above and other deficiencies occurring in the prior art, and to provide at least the advantages described below.

Accordingly, an aspect of the present invention is to provide an apparatus and method for efficiently superimposing images over each other in order to ensure objects of interest are not lost in a composite image.

Another aspect of the present invention is to provide an apparatus and method for efficiently superimposing images, where the dimensions of the overlap region are fixed.

In accordance with an aspect of the present invention, an apparatus for composing images in an image processing device is provided. The apparatus includes a display unit; and an image blending device for identifying an object in an overlap region of a plurality of images, for generating a Gaussian curve for the object, for determining an alpha mask for the overlap region using the Gaussian curve, and for blending the plurality of images based on the alpha mask.

In accordance with another aspect of the present invention, a method is provided for composing images in an image processing device. The method includes identifying an object in an overlap region of a plurality of images; generating a Gaussian curve for the object; determining an alpha mask for the overlap region using the Gaussian curve; and blending the plurality of images based on the alpha mask.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will be described in detail below with reference to the accompanying drawings. Specific details as set forth in the following description are provided to help the understanding of the present invention and it will be understood to those skilled in the art that many modifications can be made to the present invention within the scope and spirit of the present invention, without those specific details.

The embodiments described herein provide a method for guiding profile based alpha mask generation.

Throughout the specification, the word visual content and images are used interchangeably. An image can be any digital image which can refer to raster images/alpha map images. Further, the images can be captured using a digital camera or similar device, and/or other methods employing analog medium such as photographs, photographic film, or printed paper, by an image scanner or similar device.

Throughout the specification, the words alpha mask, alpha channel, and alpha matrix are used synonymously and interchangeably, to describe a matrix or array that constitutes alpha values for an overlap region.

Figure 1:
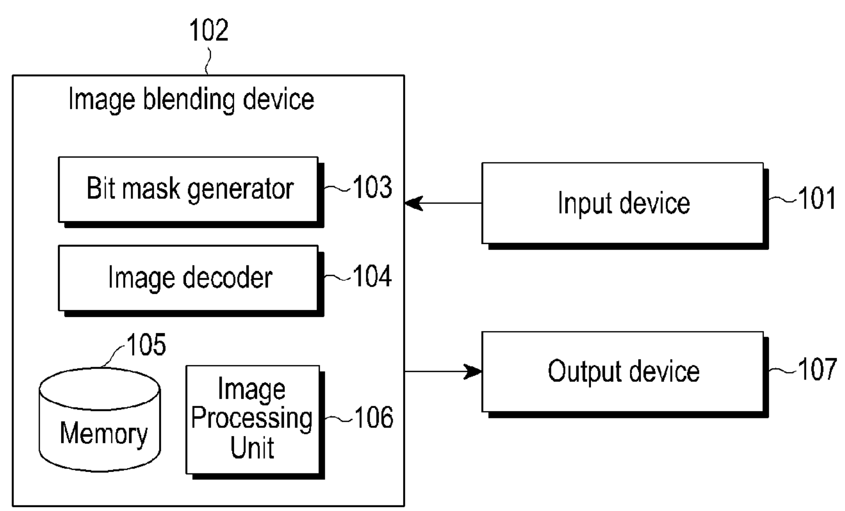
FIG. 1 is a block diagram illustrating an image processing device, according to an embodiment of the present invention.

FIG. 1 is a block diagram illustrating an image processing device, according to an embodiment of the present invention.

Referring to FIG. 1, the image processing device includes an image blending device 102, an input device 101, and an output device 107. The image blending device 102 includes a digital image decoder 104, a memory 105, an image processing unit 106, and an alpha mask generator 103. The memory 105 stores images and/or any other visual content. The image decoder 104 decodes received images and decodes pixel values of the images. The alpha mask generator 103 generates alpha mask array data, which can be used by the image processing unit 106.

The image processing unit 106 analyzes and process the received images, and blends the images together. In accordance with an embodiment of the present invention, the blended image can be displayed on the output device 107, e.g., a screen/monitor, a Personal Computer (PC), a Personal Digital Assistant (PDA), a mobile device, a digital picture frame, a hardcopy printed from a printer, etc.

Alternatively, the images can be received from a digital camera that enables users to capture images and save them in digital format in the memory/database 104. The digital camera may be a standalone device or a part of another device, such as a mobile device, a PDA, etc. The images to be blended can be provided to the image blending device 102 through the input device 101, a mobile device, a camera, a database, the memory 104, a PDA, a scanner, a Compact Disc (CD), a Digital Versatile Disc (DVD), etc.

Alternatively, the image blending device 102 can interact with a remote computer over a network such as the Internet. The network can be wired or wireless.

A remote system can be established to provide image services and products over the network. For example, the remote system includes an image rendering facility and a data center.

Specifically, the image blending device 102 receives images from the data center of the remote system over network. The images may be delivered through an e-mail from a remote user to the image blending device 102. The image blending device 102 processes the images and then blends them to form a composite image. Further, the blended images can then be delivered and displayed on the remote system.

Figure 2:
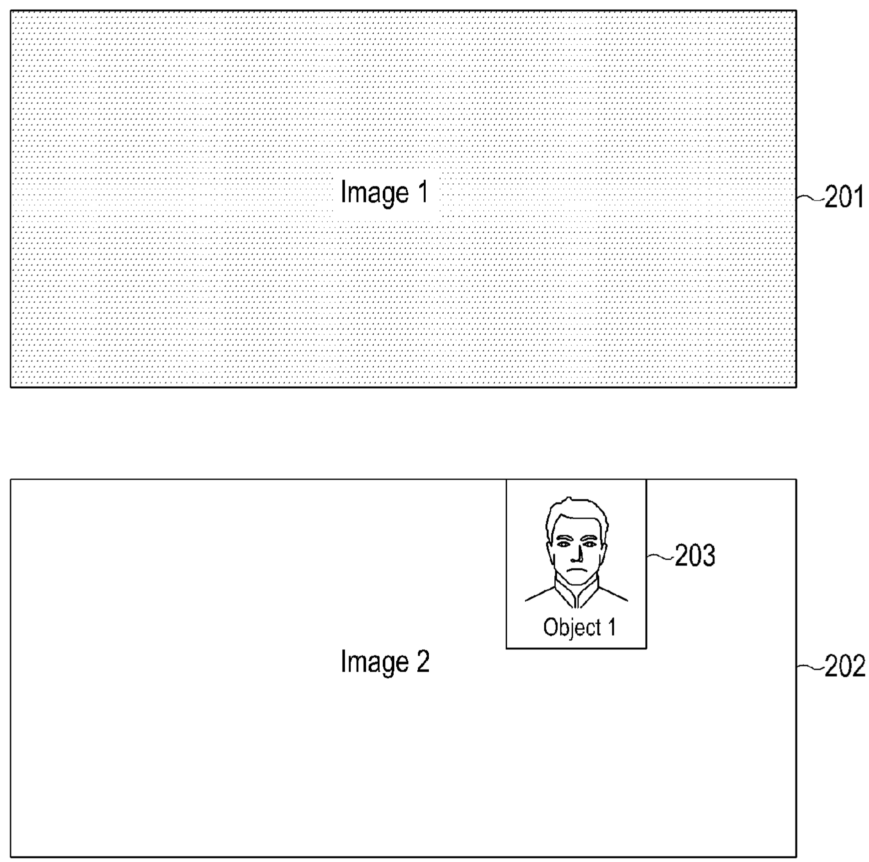
FIG. 2 illustrates two distinct input images, according to an embodiment of the present invention.
Figure 3:
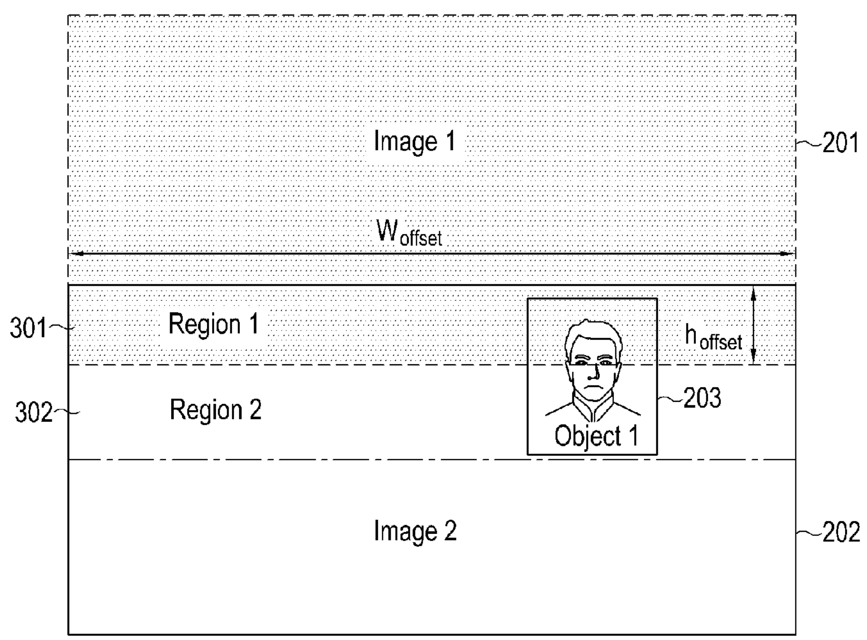
FIG. 3 illustrates a blended image, according to an embodiment of the present invention.

FIG. 2 illustrates two distinct input images, according to an embodiment of the present invention, and FIG. 3 illustrates a blended image, according to an embodiment of the present invention.

Referring to FIG. 2, image 1 201 and image 2 202 are two images to be blended, wherein image 2 202 includes an object 203. Image blending refers where two distinct and/or possibly dissimilar images are blended/mixed together over a region 1/overlap region 301 in order to get a single composite image, as illustrated in FIG. 3.

Referring to FIG. 3, the image 1 201 and image 2 202 are blended/mixed together over a region 1/overlap region 301 to get a single composite image. Further, when image 1 201 and image 2 202 overlap, image 1 201 is the background image and image 2 202 is the foreground image of the blended image. Further, the object 203 of image 2 202 lies in the region 1/overlap region 301. The region in which image 1 201 overlaps image 2 202 is region 2 302. Accordingly, the object 203 partially lies in the region 1/overlap region 301.

For example, in FIGS. 2 and 3, the object 203 is a face, wherein a part of the face is located in the region 1/overlap region 301 having a width '$W_{offset}$' and a height '$h_{offset}$'.

Further, the part of the object 203 in the overlapping region 301 is detected and Alpha Blending is performed on the part of object 203 in the overlapping region 301 in order to blend the object 203 on image 1 201, without fading. The Alpha Blending technique combines multiple source images by arranging pixels in an alpha mask array, where each of the arrays comprises 0's and/or 1's. An alpha value '0' indicates transparency and an alpha value '1' indicates opacity.

Figure 4:
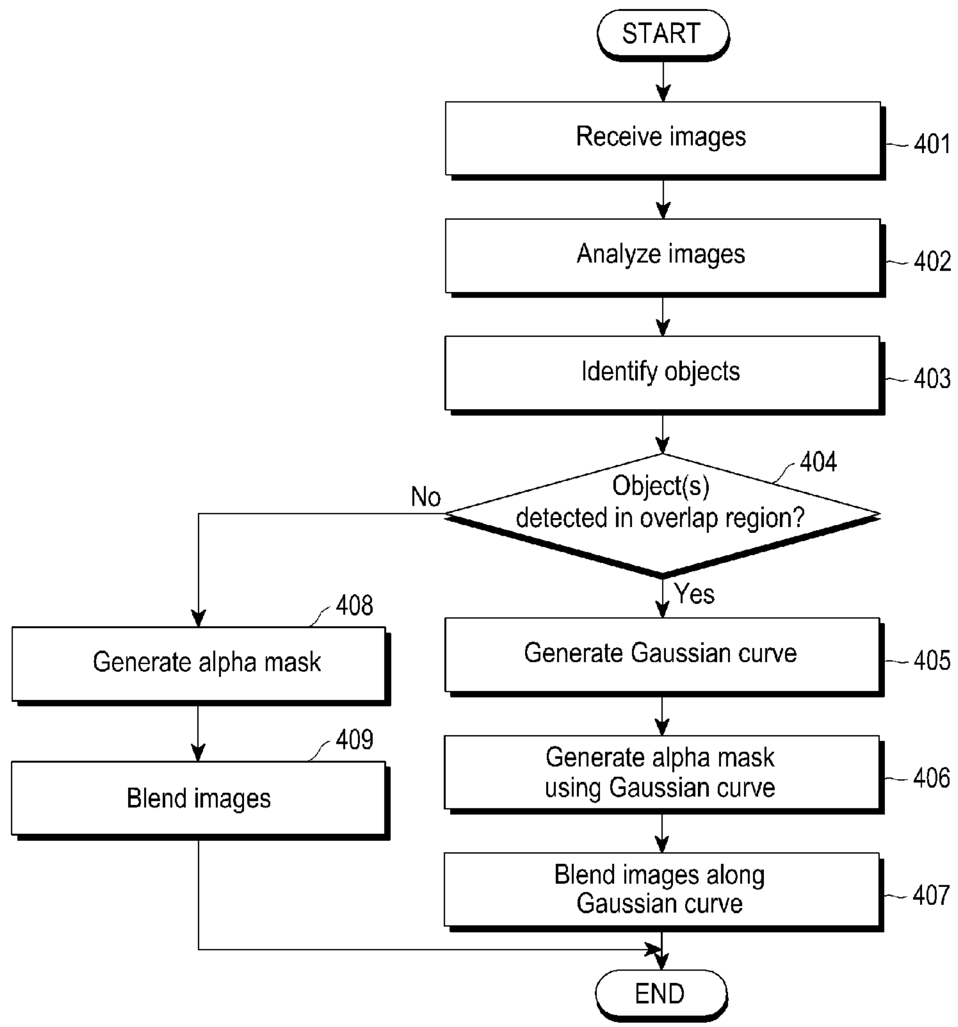
FIG. 4 is a flow chart illustrating a process of image blending based on alpha mask generation, according to an embodiment of the present invention.

FIG. 4 is a flow chart illustrating a process of image blending based on alpha mask generation, according to an embodiment of the present invention.

Referring to FIG. 4, images to be blended are received by an image processing device in step 401. In step 402, the received images are analyzed according to a user or predefined requirements. The user or an external module can provide information related to overlapping, e.g., a height of overlapping, a width of overlapping, etc.

In step 403, objects are identified from the analyzed images.

In step 404, the image processing device determines if the identified objects are in an overlapping region the blended image. If the object(s) are in the overlapping region of the blended image, a Gaussian curve is generated for the object(s) in step 405.

In step 406, an alpha mask is generated for the object(s) present in the overlap region using their Gaussian profile. In step 407, images are blended along a Gaussian curve using any known blending methods, such as Alpha blending method.

However, if the object(s) do not lie in the overlap region in step 404, an alpha mask for the object(s) is generated in step 408. In step 409, the images are blended using any known blending methods.

The various actions in the method of FIG. 4 can be performed in the order presented, in a different order or simultaneously. Further, in some embodiments, some actions listed in FIG. 4 can be omitted.

Figure 5:
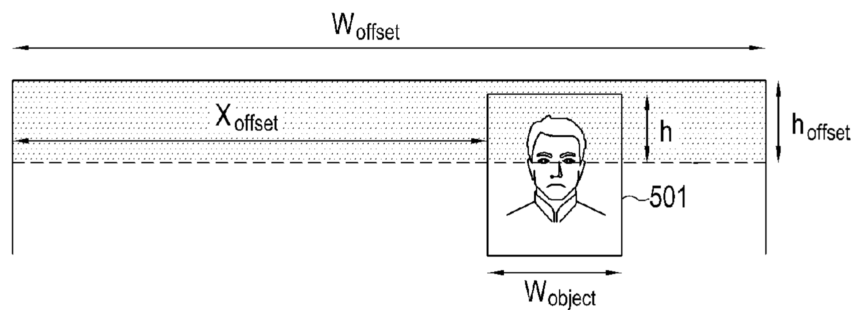
FIG. 5 illustrates object positioning in an overlap region, according to an embodiment of the present invention.

FIG. 5 illustrates object positioning in an overlap region, according to an embodiment of the present invention.

Referring to FIG. 5, a part of an object 501 is in an overlap region having a width '$w_{offset}$'. The width of the object 501 is '$w_{object}$'. Further, an offset of the object 501 from a beginning of the width of the overlap region to the object 501 is '$x_{offset}$'. Furthermore, the height of the overlap region and a part of the object 501 that lies in the overlap region are '$h_{offset}$' and 'h', respectively.

Figure 6:
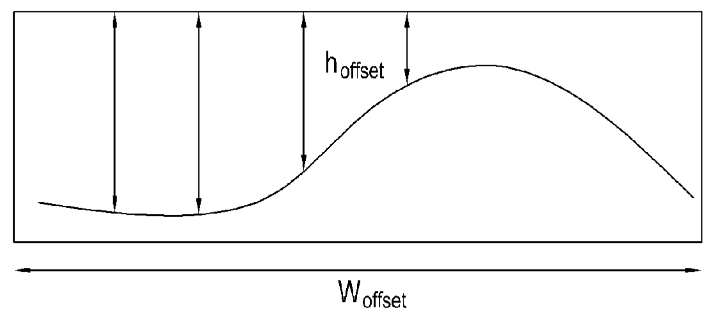
FIG. 6 is graph illustrating Gaussian curve encompassing an object, according to an embodiment of the present invention.

FIG. 6 is a graph illustrating a Gaussian curve encompassing an object, according to an embodiment of the present invention.

Referring to FIG. 6, the Gaussian curve illustrates a Gaussian distribution, which is a continuous probability distribution that can be used as a first approximation to describe real-valued random variables that tend to cluster around a single mean value. The graph of the associated probability density function is bell-shaped and quickly falls off towards plus/minus infinity. The Gaussian curve provides a convenient choice for modeling a large variety of random variables. For example, the alpha mask generation may be guided by a Gaussian profile, where the Gaussian curve is determined by Equation (1).

$$y = ae^{\frac{-(x-b)^2}{2c^2}} \tag{1}$$

In Equation (1), a represents a peak/maximum value of the curve, b represents a mean value of the curve, i.e., a position of the center of the peak, e represents Euler's number, and c represents a width of the Gaussian curve according to Equation (2).

$$c = \frac{HWHM}{2\sqrt{2\ln 2}} \tag{2}$$

In Equation (2), HWHM is the Half Width at Half Maximum.

The information about the object 501 in the overlap region can be provided in the form of a width, a height, and co-ordinates to the system. Further, the values of parameters a, b, and c for the object 501 in the overlap region are determined using Equation (3).

$$a = h \tag{3}$$
$$b = x_{offset} + \frac{w_{object}}{2}$$
$$c = \frac{2w_{object}}{2\sqrt{2\ln 2}}$$

In Equation (3), h represents a height of the object 501 present in the overlap region, $x_{offset}$ represents a width from a start of the overlap region to the object 501, and $w_{object}$ represents a width of the object 501 in the overlap region.

In accordance with an embodiment of the present invention, some background information behind the object 501 can be included by considering twice the object 501 width as the HWHM. Further, the value of the HWHM can be determined by a user or an external system.

Figure 7:
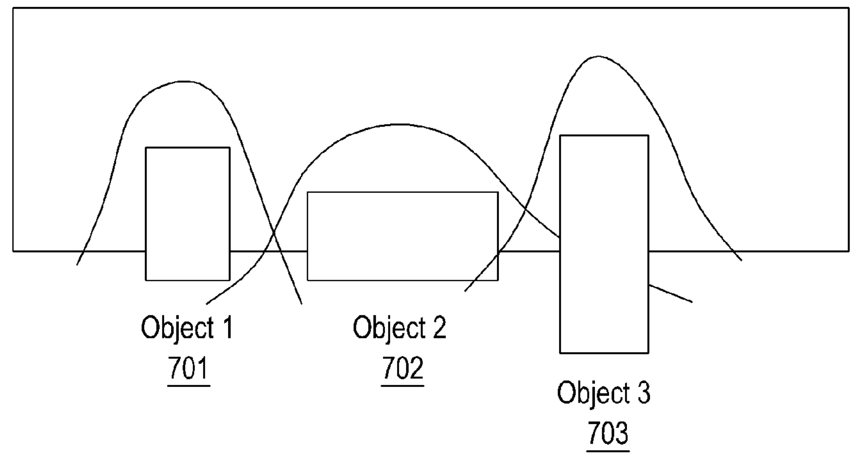
FIG. 7 is graph illustrating a gradient of a simple linear slope, according to an embodiment of the present invention.

FIG. 7 illustrates a plurality of objects in an overlap region, according to an embodiment of the present invention.

Referring to FIG. 7, the region 1/overlap region includes the plurality of objects, i.e., object 1 701, object 2 702, and object 3 703. A Gaussian curve is determined for each of the objects 701 to 703.

In accordance with an embodiment of the present invention, the final Gaussian curve can be determined by superposition of individual Gaussian curves centered around each of the object 701 to 703, wherein the final Gaussian curve is given by Equation (4).

$$y=y_1+y_2+y_3 \ldots y_n \tag{4}$$

In Equation (4), $$y_i = a_i e^{\frac{-(x-b_i)^2}{2c_i^2}}$$

where $a_i$, $b_i$, and $c_i$ can be calculated for an $i^{th}$ object by the aforementioned technique.

In accordance with another embodiment of the present invention, the final Gaussian curve for the plurality of objects in the region 1/overlap region can be determined by taking a minimum value of the overlapping curves, wherein the final Gaussian curve is given by Equation (5).

$$y=\min(y_1,y_2,y_3, \ldots y_n) \tag{5}$$

Figure 8:
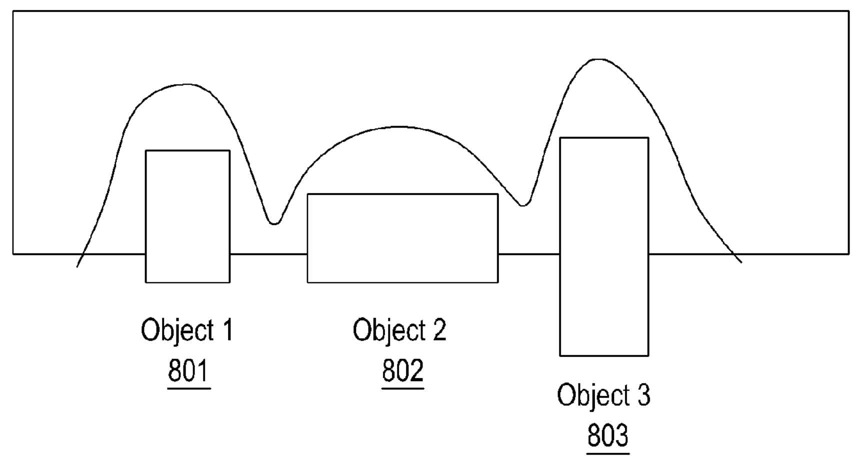
FIG. 8 illustrates plurality of objects in an overlap region, according to an embodiment of the present invention.

FIG. 8 illustrates a composite guiding profile constructed from individual curves of objects, according to an embodiment of the present invention.

Referring to FIG. 8, the final guiding curve for a plurality of objects 801 to 803 in an overlap region can be determined by adding individual Gaussian curve values in order to get a basic profile.

After the basic profile is determined, values in an alpha mask can be determined. The alpha values determine the transparency information for each pixel. The alpha mask specifies translucency of the pixels across the region of overlap. All the alpha values on the Gaussian curve and below it can be considered to be 1 in order to disable visibility of image 1 over the object of interest by making image 2 opaque. The opaque image 2 can protect and highlight the object of interest.

The remaining alpha mask values can be determined by varying alpha values from 0 to 1 such that the pixel values start from 0 and rise gradually to 1 as the pixel values reaches the Gaussian curve.

Figure 9:
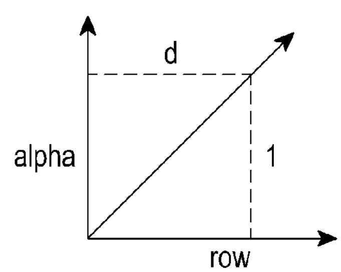
FIG. 9 illustrates a composite guiding profile constructed from individual curves of objects, according to an embodiment of the present invention.

FIG. 9 is graph illustrating a gradient of a simple linear slope, according to an embodiment of the present invention.

Referring to FIG. 9, the gradient for the alpha value may vary to get varying results. For example, the alpha value for the linear gradient is given by Equation (6).

$$\alpha = \alpha_{max} \times \left(\frac{\text{row}}{d}\right) \tag{6}$$

In Equation (6), row=0 is at a top of the overlap region and increases downwards, d represents a distance from row=0 to the Gaussian curve, and $\alpha_{max}$ represents a maximum value of alpha. Generally, $\alpha_{max}$ is 1, but to avoid floating point arithmetic in implementation, it may be a higher number, e.g., 255.

In accordance with an embodiment of the present invention, a non-linear gradient can be considered in order to avoid a ghosting effect on the blended image. For example, the alpha value for non-linear gradient is given by Equation (7).

$$\alpha = \alpha_{max} \times \left(\frac{\text{row}}{d}\right)^k \tag{7}$$

In Equation (7), k is a positive real number, and $$\frac{\text{row}}{d} < 1$$

for all row □[0, d].

The non-linear gradient equation in Equation (7), can be reduced to a linear gradient equation by assigning k=1. Further, Equation (7) takes a concave shape with respect to the Y-axis where the curve can rise gradually from alpha value 0 to a point of maximum concavity and then start to rise rapidly to alpha value 1. The concave curve reduces the ghosting effect by eliminating a large number of mid-range alpha values.

After determining the alpha mask, the images are blended, e.g., using alpha blending, Poisson blending, etc. For example, in alpha blending, the final pixel of an overlap region is calculated using Equation (8).

$$P_{overlap} = \frac{\alpha P_1 + (\alpha_{max} - \alpha)P_2}{\alpha_{max}} \quad (8)$$

In Equation (8), P1 represents a last pixel of a image 1 and P2 represents a pixel of the image 2 overlapped to P1.

In accordance with an embodiment of the present invention, an object of image 2 in a region 1/overlap region can cover almost an entire image 1, such that a majority of the region 1 can be occupied by the object or part of the object. Further, region 2 may have relatively low data, but be highly contrasting as compared to region 1. An alpha mask profile can be deployed to get final blended image.

Figure 10:
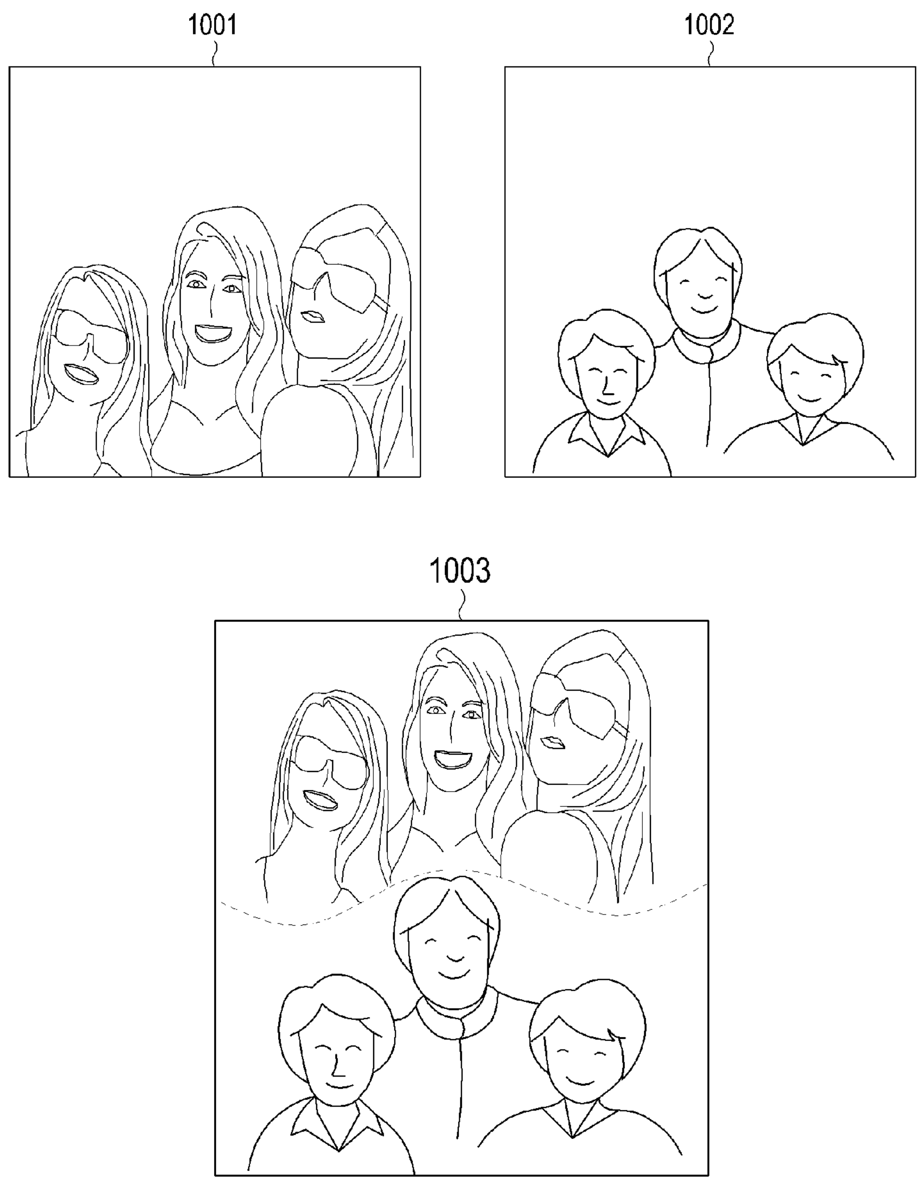
FIG. 10 illustrates blending images by alpha mask generation, according to an embodiment of the present invention.

FIG. 10 illustrates blending images by alpha mask generation, according to an embodiment of the present invention.

Referring to FIG. 10, images 1001 and 1002 are input images. Accordingly, when image 1001 is blended with image 1002, an overlap region can be determined, which includes a plurality of objects from image 1002. The plurality of objects in image 1002 should be protected in the overlap region, i.e., should not be blended with the image 1001. After performing the aforementioned blending method with an alpha mask generation, the plurality of objects are protected. Further, the plurality of objects can have highlight effect, thereby enhancing the visual appeal of the final blended image 1003.

Additionally, the embodiments disclosed herein may be implemented through at least one software program running on at least one hardware device and performing network management functions to control the network elements. The network elements illustrated in FIG. 1 include blocks that can be a hardware device or a combination of hardware device and software.

The above-described embodiments disclosed herein provide methods and systems for customization of an application to enhance a user experience on a computing device by having one or more resident client entities negotiate with one or more client execution entities or a server on aspects of said application that can be customized. Therefore, it is understood that the scope of the protection is extended to such a program and in addition to a computer readable device having a message therein, such a computer readable storage device contains program code for implementation of one or more steps of the method, when the program runs on a server or mobile device or any suitable programmable device.

The method may be implemented through or together with a software program written in, e.g., Very high speed integrated circuit Hardware Description Language (VHDL) or another programming language, or implemented by one or more VHDL or several software modules being executed on at least one hardware device. The hardware device can be any kind of portable device that can be programmed. The device can also include hardware, like an Application Specific Integrated Circuit (ASIC), or a combination of hardware and software, e.g., an ASIC and a Field Programmable Gate Array (FPGA), or at least one microprocessor and at least one memory with software modules located therein. Alternatively, the present invention can be implemented on different hardware devices, e.g., using a plurality of Central Processing Units (CPUs).

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for composing images in an image processing device, the method comprising:

identifying an object in an overlap region of a plurality of images;

generating a Gaussian curve for the object;

determining an alpha mask for the overlap region using the Gaussian curve; and blending the plurality of images based on the alpha mask.

2. The method of claim 1, wherein the Gaussian curve is generated using:

$$y = ae^{\frac{-(x-b)^2}{2c^2}},$$

where a represents a peak/maximum value of the Gaussian curve, b represents a mean value of the Gaussian curve, e represents Euler's number, and c represents a width of the Gaussian curve, based on:

$$c = \frac{HWHM}{2\sqrt{2\ln 2}}$$

where HWHM is a Half Width at Half Maximum.

3. The method of claim 2, wherein the Gaussian curve is determined by:

$$a = h$$

$$b = x_{offset} + \frac{w_{object}}{2}$$

$$c = \frac{2w_{object}}{2\sqrt{2\ln 2}},$$

where h represents a height of the object in the overlap region, $x_{offset}$ represents a width from a start of the overlap region to the object in the overlap region, and $w_{object}$ represents a width of the object in the overlap region.

4. The method of claim 2, wherein when two objects are identified in the overlap region, generating the Gaussian curve, further comprises super-positioning individual Gaussian curves centered around the objects.

5. The method of claim 2, wherein when two objects are identified in the overlap region, generating the Gaussian curve further comprises identifying a minimum value of overlapping curves of the objects.

6. The method of claim 1, wherein the alpha mask is determined using a gradient equation given by:

$$\alpha = \alpha_{max} \times \left(\frac{\text{row}}{d}\right)^k,$$

where k is a positive real number, row=0 at top of the overlap region and increases downwards, d represents a distance from row=0 to the Gaussian curve, and $\alpha_{max}$ is a maximum value of the alpha mask.

7. An apparatus for composing images in an image processing device, the apparatus comprising:

a display unit; and an image blending device for identifying an object in an overlap region of a plurality of images, for generating a Gaussian curve for the object, for determining an alpha mask for the overlap region using the Gaussian curve, and for blending the plurality of images based on the alpha mask.

8. The apparatus of claim 7, wherein the Gaussian curve is generated using:

$$y = ae^{\frac{-(x-b)^2}{2c^2}},$$

where a represents a peak/maximum value of the Gaussian curve, b represents a mean value of the Gaussian curve, e represents Euler's number, and c represents a width of the Gaussian curve, based on:

$$c = \frac{HWHM}{2\sqrt{2\ln 2}}$$

where HWHM is a Half Width at Half Maximum.

9. The apparatus of claim 7, wherein the Gaussian curve is determined by:

$$a = h$$

$$b = x_{offset} + \frac{w_{object}}{2}$$

$$c = \frac{2w_{object}}{2\sqrt{2\ln 2}}$$

where h represents a height of the object in the overlap region, $x_{offset}$ represents a width from a start of the overlap region to the object in the overlap region, and $w_{object}$ represents a width of the object in the overlap region.

10. The apparatus of claim 7, wherein when two objects are identified in the overlap region, the image blending device generates the Gaussian curve by super-positioning of individual Gaussian curves centered around the objects.

11. The apparatus of claim 7, wherein when two objects are identified in the overlap region, the image blending device generates the Gaussian curve by using a minimum value of overlapping curves of the objects.

12. The apparatus of claim 7, wherein the alpha mask is determined using a gradient equation given by:

$$\alpha = \alpha_{max} \times \left(\frac{\text{row}}{d}\right)^k,$$

where k is a positive real number, row=0 at top of the overlap region and increases downwards, d represents a distance from row=0 to the Gaussian curve, and $\alpha_{max}$ is a maximum value of the alpha mask.

* * * * *